Figure 1:
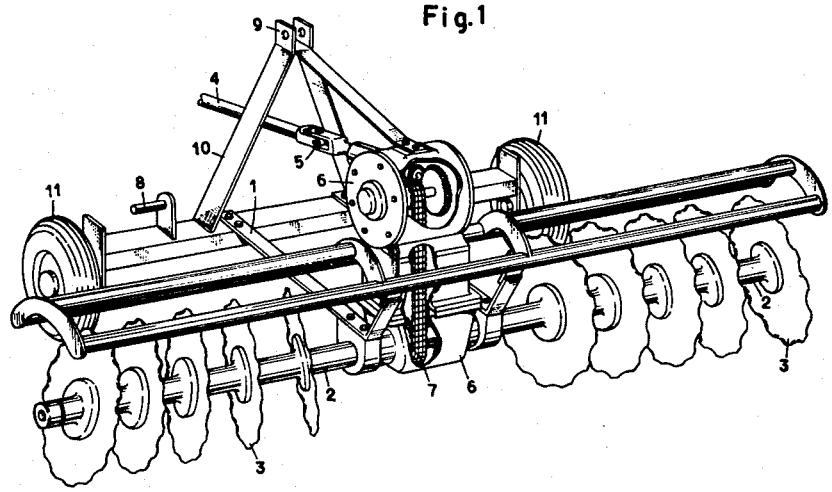

Oct. 25, 1960     J. S. KALLER     2,957,529
DISK CULTIVATOR

Filed March 27, 1957     2 Sheets-Sheet 1

Inventor
J. S. Kaller
By Glascock Downing Seebold
Attys.

Oct. 25, 1960    J. S. KALLER    2,957,529
DISK CULTIVATOR
Filed March 27, 1957    2 Sheets-Sheet 2

Inventor
J. S. Kaller

United States Patent Office 2,957,529
Patented Oct. 25, 1960

2,957,529

DISK CULTIVATOR

Johan Sigurd Kaller, Vadursgatan 2A, Linkoping, Sweden

Filed Mar. 27, 1957, Ser. No. 648,820

Claims priority, application Sweden Dec. 11, 1956

3 Claims. (Cl. 172—120)

This invention relates to improvements in cultivators of a type comprising obliquely positioned ground-working disks situated on one or two driven shafts.

Other disk cultivators comprising obliquely positioned disks fixed parallel to each other on a shaft or shafts have proven to be less satisfactory in operation in that the resistance of the soil against the disks, occurring twice in every revolution of the disks causes heavy vibration in the machine.

An object of the invention is to reduce the maximum amplitude of the axial forces as directed by the ground on the disk cultivator.

Another object is to evenly distribute along the whole revolution of the shaft the impacts on the shaft from the ground resistance against the disks.

In the following detailed description of the invention, reference is had to the accompanying drawings, which form a part hereof.

Figure 2:
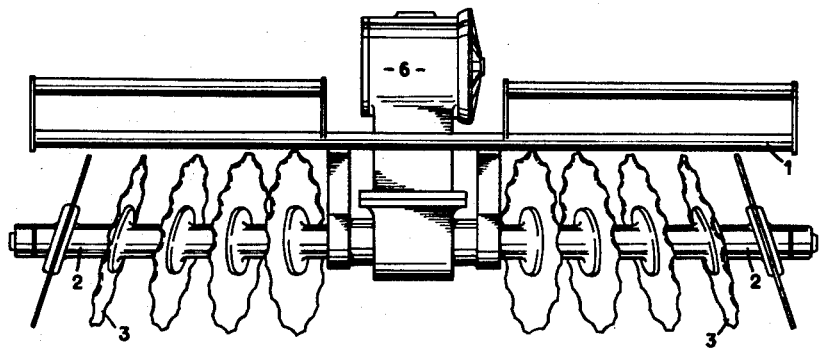

In the drawings:

Fig. 1 is a perspective three-quarter rear view of a disk cultivator constructed in accordance with a preferred embodiment of the invention intended to be coupled to a tractor by means of two hitch members and a pressure rod, generally known as three point linkage, and Fig. 2 is a rear view of the same machine.

The disk cultivator shown on the drawings comprises a frame 1 at the rear portion of which, projecting from each side of the machine a transverse shaft 2 is rotatably mounted. In accordance with the invention a number of circular disks 3 are so fixed on the two extending sections of the shaft that two groups of disks are obtained, where the disks form an acute angle with the shaft and the plane of each disk is turned in relation to the plane of the other disks. When the shaft rotates, the disks, owing to their oblique position, dig into the ground and throw the soil sideways, and should all the disks be parallel to each other the machine would be subjected to heavy lateral forces from the ground resistance twice in every revolution of the axle. This is avoided by the fact that the planes of the various disks are turned in relation to each other as more clearly shown in Fig. 1 and Fig. 2, which arrangement means that at any one time only one or two disks are so positioned that they throw the soil.

An additional reduction of the lateral forces from the ground resistance is obtained by the arrangement, especially shown in Fig. 2, whereby the various disks are so fastened on the shaft or shafts that pairs of disks have diameters at right angles to the shaft and parallel to each other while the two disks of each pair are inclined in the opposite direction to each other to compensate for axially directed forces from the ground resistance. In the case illustrated, this is thus arranged that the two groups of disks are placed symmetrically opposite each other.

The shaft or axle 2, and thereby the disks, is driven from the power take-off on a tractor (not shown) by a drive shaft 4, a universal knuckle joint 5, a gear box 6 and a chain transmission 7. The gear reduction should be so chosen that the disks are driven with a periphery speed substantially in excess of the forward speed of the machine, whereby the obliquely placed disks thoroughly till the soil.

The disk cultivator in the construction shown is intended to be hitched to the hydraulically operated lift arms on a tractor by means of the lateral pivots 8 attached to the frame 1, and to a pressure rod of which the rear end is connected to the upper end 9 of the headstock 10 attached to the frame.

The working depth of the disks is regulated by the two carrying wheels 11, one on each side of the frame. These can be adjustably arranged vertically in relation to the frame, whereby the working depth can be regulated. The working depth can even be regulated by means of the pressure rod, providing this is equipped with means for changing its length.

By means of the hydraulic lift arrangement on the tractor the complete disk cultivator can be lifted from the ground, which is useful when transporting the disc cultivator to and from the place of work.

The invention is not limited to the arrangement of a disk cultivator described above and shown in the drawings but can be modified within the scope of the appended claims. The disks 3, which by the fact that they cut down into the soil are not easily damaged by stones, can be equipped with notched edges, as shown in the drawings, or with plain edges. The disks can even be equipped with wavy edges.

What I therefore claim and desire to secure by Letters Patent is:

1. In a disk cultivator, frame means, at least one transverse shaft rotatably mounted in said frame means, gear reduction means operably connected to said transverse shaft, a plurality of circular ground-working flat disks fixed on said shaft and being at an acute angle to the shaft so that only one diameter of each disk is perpendicular to the shaft, said disks being arranged in two groups on the shaft, the perpendicular diameters defining an imaginary threaded surface wherein the increments of the circumferential twist are equal between the disks of a group with a right-hand thread in one group and a left-hand thread in the other group.

2. In a disk cultivator, frame means, at least one transverse shaft rotatably mounted in said frame means, gear reduction means operably connected to said transverse shaft intermediate the ends of the shaft, a plurality of circular ground-working disks fixed on said shaft and being at an acute angle to the shaft so that only one diameter of each disk is perpendicular to the shaft, said disks being arranged in two groups with one group at either side of the gear reduction means, the perpendicular diameters defining an imaginary threaded surface wherein the increments of the circumferential twist are equal between the disks of a group with a right-hand thread in one group and a left-hand thread in the other group.

3. In a disk cultivator, frame means, at least one transverse shaft rotatably mounted in said frame means, gear reduction means operably connected to said transverse shaft, a plurality of circular ground-working disks fixed on said shaft and being at an acute angle to the shaft so that only one diameter of each disk is perpendicular to the shaft, said disks being arranged in two groups, the perpendicular diameters defining an imaginary threaded surface wherein the increments of the circumferential twist are equal between the disks of a group with a right-hand thread in one group and a left-hand thread in the other group, and the space between the two groups of disks being at least as great as the width of a group of disks.

References Cited in the file of this patent

UNITED STATES PATENTS

| | | |
|---|---|---|
| 1,689,550 | Dick et al. | Oct. 30, 1928 |
| 1,729,073 | Johnston | Sept. 24, 1929 |
| 2,256,185 | Ariens | Sept. 16, 1941 |
| 2,503,993 | Blomgren | Apr. 11, 1950 |
| 2,526,396 | Nowlin | Oct. 17, 1950 |